March 31, 1964    J. R. DESJARDIN ET AL    3,126,747
CONTROL APPARATUS
Filed May 26, 1961
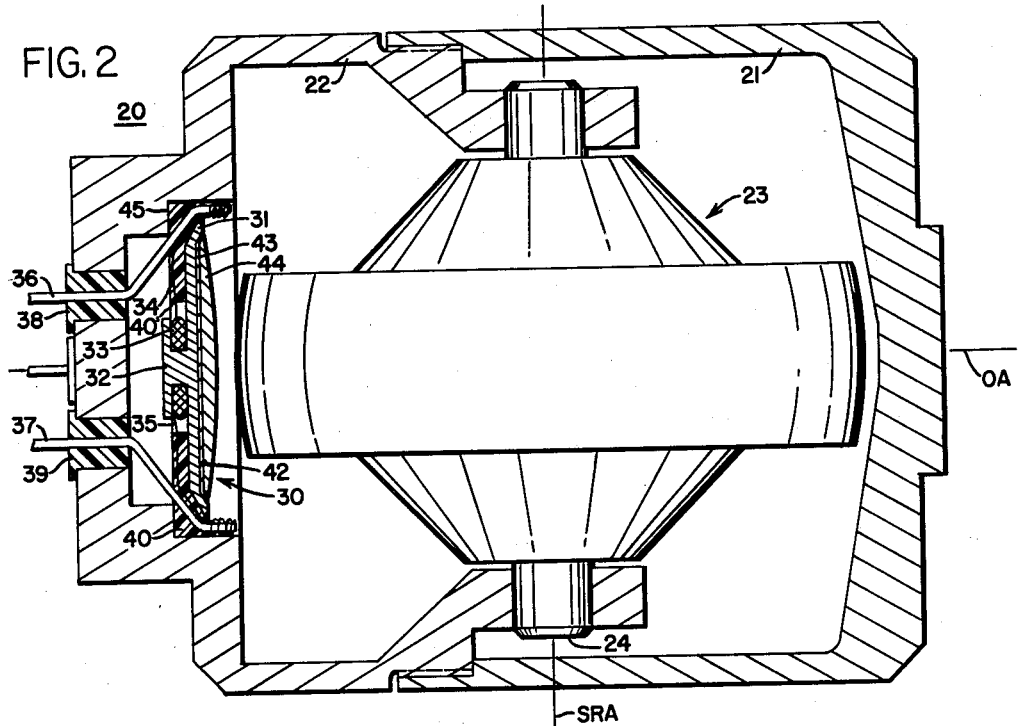
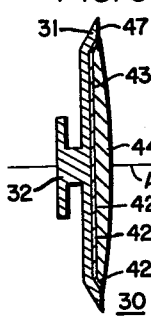 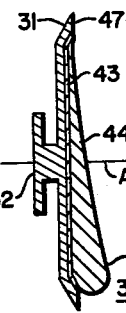 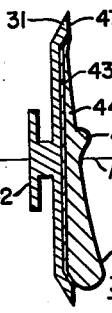 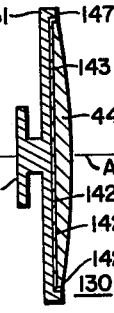 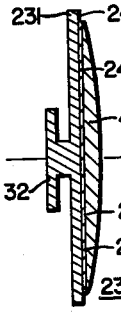
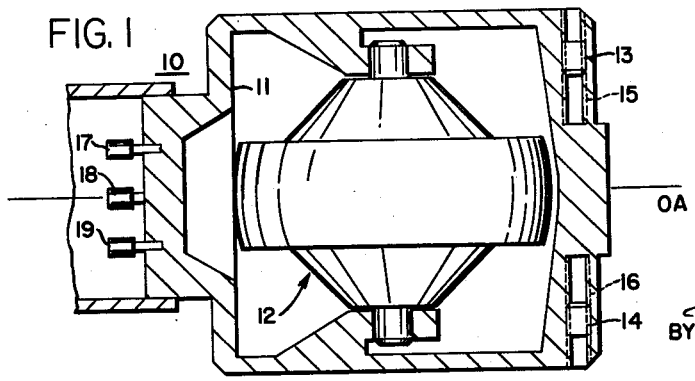
INVENTORS.
JAMES R. DESJARDIN
FREDERICK HUBER
JAMES W. TINKHAM
BY Roger W. Jensen
ATTORNEY

3,126,747
CONTROL APPARATUS

James R. Desjardin, Columbia Heights, Frederick Huber, St. Louis Park, and James W. Tinkham, Minneapolis, Minn., assignors to Minneapolis-Honeywell Regulator Company, Minneapolis, Minn., a corporation of Delaware Filed May 26, 1961, Ser. No. 112,996
10 Claims. (Cl. 74—5)

The present invention pertains generally to control apparatus and more particularly to apparatus for adjusting the static balance of a rotatable element. This invention has application to many sensitive instruments and has specific although not limited application to the field of floated instruments such as gyroscopes and accelerometers. In the manufacture of a sensitive instrument such as a floated gyroscope, it is mandatory that the rotatable element, or gimbal, be balanced to a very fine degree. Present-day high-quality inertial guidance type of gyroscopes require that this static balance be maintained to a tolerance less than .5 dyne centimeters.

At the present time, the majority of such floated gyroscopes are statically balanced from approximately 200 dyne centimeters of unbalance down to approximately 10 dyne centimeters by means of balance screws attached to one end of the gimbal element. The gyroscopes are then statically balanced from the 10 dyne centimeter level of unbalance down to the acceptable amount of unbalance by means of gold tabs attached to the other end of the gimbal element. There are a number of inherent disadvantages in balancing with these two balancing means. One of the major disadvantages is that after the unbalance of the assembled gyroscope is determined, the gyro casing must be opened and the gold tabs must be properly adjusted. This may result in the fluid becoming contaminated and consequently requiring the gyro to be disassembled and rebuilt. Another major disadvantage is that the gold tabs may be displaced or bent only a very limited number of times without fracturing; of course, a gold tab fracture results in the disassembly and rebuilding of the gyro.

Recently, static balancing means utilizing thermoresponsive means have seen limited use in floated gyroscopes. The utilization of thermoresponsive balancing means permit the gimbal element to be balanced without opening the gyro casing and subjecting the gyro to the danger of contamination and also eliminates the need for the balancing screws and gold tabs. The thermoresponsive balancing means are one of two general types. They provide means for reducing the thermoresponsive means to a plastic state so that (1) either an object of different density than the thermoresponsive means may be displaced relative to the gimbal element, or (2) the thermoresponsive means itself may be displaced in its entirety, relative to the gimbal element, so as to adjust the balance thereof. The applicants' invention is an improvement over these prior art thermoresponsive static balancing means. The applicant's unique balancing means permits the thermoresponsive means, or any portion thereof, to become plastic and shift its center of mass so as to balance the gimbal element without altering the position or the area of the surface of contact between the thermoresponsive means and the gimbal element.

It has been shown that this results in a great improvement over the prior art type of thermoresponsive balancing devices in that it allows a balancing means which provides greater reliability, greater repeatability, more accurate compensation, and a faster means of accomplishing such balancing. In addition, the applicants' invention provides the advantages of lower cost and easier machinability in the manufacture of the balancing means.

It is therefore an object of this invention to provide an improved means and method for statically balancing a rotatable element about its axis.

A further object of this invention is to provide an improved thermoresponsive means for statically balancing a rotatable element about an axis and to provide a method of accomplishing this balance.

These and other objects of the invention will become apparent from the study of the accompanying specification and claims in conjunction with the drawing in which:

FIGURE 1 is a cross-sectional view of a prior art gyro gimbal element illustrating the balancing screws and balancing tabs thereof;

FIGURE 2 discloses a sectional view of a gyroscope gimbal element utilizing the applicants' invention;

FIGURE 3 discloses a sectional view of the applicants' invention;

FIGURE 4 discloses another sectional view of the applicants' invention;

FIGURE 5 discloses still another sectional view of the applicants' invention;

FIGURE 6 discloses an alternate embodiment of the applicants' invention; and

FIGURE 7 discloses another embodiment of the applicants' invention.

Referring to FIGURE 1 the reference numeral 10 generally depicts a gimbal of a prior art gyroscope. The gimbal is somewhat schematically represented as including a gimbal element 11 supporting the spin motor assembly 12 therein. Two balancing screws 13 and 14 are illustrated as positioned in threaded openings 15 and 16. Normally there are four such balancing screws positioned at 90° intervals about the output axis OA. It should be pointed out that the balancing screws are utilized so as to rough-balance the gimbal element about the OA, that is from approximately 200 dyne centimeters of unbalance down to approximately 10 dyne centimeters of unbalance. The other end of the gimbal element 11 discloses gold tabs 17, 18 and 19. Normally there are four such gold tabs positioned symmetrically about the OA at 90° intervals. The gold tabs are utilized for the fine balance of the gimbal 11 about the OA, that is, from approximately 10 dyne centimeters of unbalance down to the accepted level of unbalance, approximately .5 dyne centimeters.

Referring to FIGURE 2, the reference numeral 20 generally depicts a gimbal element of the type normally utilized in a floated gyroscope. The gimbal is somewhat schematically represented as comprising a cup-like element 21 cooperating with a cuplike element 22 so as to form a cylindrically shaped gimbal element. A spin motor assembly 23 is shown rotatably mounted to element 22 by means of a shaft 24. It should be pointed out that the gimbal element 20 is mounted within the gyro housing (not shown) by suitable bearing means (not shown) for rotation about the output axis OA.

Reference numeral 30 generally depicts a balancing means comprising a symmetrically shaped holder element 31. Holder element 31 is best illustrated in FIGURE 3 and includes a saucer-shaped surface 42 consisting of a generally circular coplanar portion 42A and an edge portion 42B around the periphery thereof. The edge portion 42B intersects the coplanar portion 42A at an obtuse angle, thus defining the saucer-shaped surface. Holder element 31 is also provided with a centrally located extension 32 extending outwardly from the opposite side of the element than surface 42 and having a T-shaped cross section. Extension 32 is an integral part of holder element 31 and is aligned along the axis of symmetry thereof. The holder element 31 is manufactured from a good heat conductor material, such as aluminum.

Referring to FIGURE 2, the element 31 is shown generally aligned within the gimbal means 20 so that its axis of symmetry is aligned with the OA although in some embodiments it may be desired to have the symmetrical axis of element 31 offset from the OA. Cuplike gimbal element 22 is provided with a recess 45 in its end wall in which an insert means 40 is secured by suitable means. Insert means 40 is manufactured from a ceramic or other suitable insulator material. Insert means 40 in turn serves as a support for the mounting thereon of holder element 31. The insert means 40 is provided with a central aperture 40′ which allows extension 32 of holder element 31 to extend therethrough when the holder element is mounted upon the insert means 40.

The function of the extension 32 is to provide a means of attaching a heating coil means 33 to the holder element 31. As shown in FIGURE 2 the heating coil means 33 is connected to a suitable power source (not shown) by means of a pair of leads 34 and 35 which are in turn connected to a pair of lead-in means 36 and 37. It will be noted that lead-in means 36 and 37 each project through a bore in insert means 40 and extend slightly past the insert means. This structure allows the leads 34 and 35 to be soldered to the lead-in-means 36 and 37 after the insert means 40 has been mounted within the gimbal element 22. Lead-in means 36 and 37 are insulated from the element 22 by means of insulating plugs 38 and 39. The surface 42 of holder element 31 is treated with a suitable material, such as nickel plate with a gold flash superimposed thereon. The treated surface is identified by reference numeral 43. It should be noted that there is no such treatment on the outer surface 47 of the edge portion 42B. A suitable thermoresponsive means 44 is positioned so as to abut surface 43 and adhere thereto. The thermoresponsive means may be any one of a variety of commercially available materials which possess a low temperature melting point, in the range of 300° F. One suitable type of thermoresponsive means that has been utilized is identified by the trademark "Cerrotru." The thermoresponsive means 44 is normally in the solid state and maintains the shape illustrated in FIGURES 2 and 3 prior to any balancing operation.

*Operation*

In the manufacture of a sensitive instrument such as a floated gyroscope wherein it is essential that a rotatable element be statically balanced, the design of the rotatable element will inherently be such that the static balance falls within a predetermined range of unbalance. In practice, it has been found that the normal gimbal unbalance of a floated gyro is less than 200 dyne centimeters, without any balancing whatsoever. The normal method of balancing such a gimbal is to adjust the balance screws (e.g. 13 and 14 as illustrated in FIGURE 1) in such a manner that the gimbal is rough balanced, to within a certain predetermined limit. Normally the gyro gimbal is rough balanced to within 10 dyne centimeters of unbalance. This rough-balancing operation is normally performed on the gimbal assembly 11 prior to the gimbal being placed within the gyro housing, that is, prior to the complete assembly of the gyro. After the complete assembly of the gyro, the gyro is tested so as to determine the static unbalance of the gimbal element 11 about the OA. Then the gyro is reopened and the gold tabs (e.g. 17, 18 and 19) are adjusted so as to balance the gimbal element 11 about the OA within the acceptable limit. As previously stated, this results in a number of problems such as contamination and breakage.

The applicants' invention eliminates the need for both the balance screws (such as 13 and 14) and the gold tabs (such as 17, 18 and 19.) The required rough balance and fine balance can be obtained through the utilization of the balancing means 30. The balancing operation will now be explained with reference to FIGURES 3 through 5. Like components are given like reference numerals.

In FIGURE 3, the thermoresponsive means 44 is shown in its original position, in the solid state, adhering to surface 43 of element 31. The balancing element 30 is illustrated in FIGURE 3 in the solid state form prior to being mounted within insert 40 and prior to any balancing operation. After the gyro has been completely assembled, the unbalance of the gimbal element 20 about the output axis OA is determined by a suitable test. One such test comprises holding the OA horizontal, energizing a spin motor of the gyro, and rotating the gyro casing about the OA. The floated gyro includes a signal generator and a torque generator of the well-known types connected through a suitable closed loop so that the gimbal element 20 is continually servoed to its null position. As the gyro casing is being rotated about the OA, a trace is made of the torque generator current for the complete revolution. By subtracting the earth rate input and other fixed torques from the trace of the torque generator current, a measurement of the gimbal unbalance is obtained. Consequently, the magnitude and location of the unbalance is obtained. The the OA of the gyroscope is placed vertical, or parallel to the earth gravity vector. While the gyro is in this position the axis of symmetry of holder element 31 is parallel to the gravity vector of the earth and the coplanar surface 42A is perpendicular thereto. The gyro is now oriented relative to the earth's gravity vector to a position determined by the location and magnitude of the unbalance. The correct position is determined by the establishment of a calibration curve for the balancing means 30. The heating coil means 33 are energized so as to apply heat to the thermoresponsive means 44 so that all of the thermoplastic means 44 become plastic. Due to the orientation of the balancing element 30 and the earth's gravitation force the center of mass of the thermoresponsive means shifts relative to the element 31 and consequently relative to the OA. It should be pointed out that the affinity between the thermoresponsive means 44 and the treated surface 43, cooperating with the surface tension of the thermoresponsive means 44, plus the lack of affinity between the thermoresponsive means 44 and the non-treated surface 47, maintain the thermoresponsive means in contact with the original area to which it adhered. That is to say that there is absolutely no change in either the location or the position of the interface of the thermoresponsive means 44 and the treated surface 43 either when the thermoresponsive means are in the plastic state or in the solid state. The energization of the heating coil means 33 is then removed and the thermoresponsive means 44 cools and solidifies in a configuration such as shown in FIGURE 4. Note that a substantial shift of the center of mass of thermoresponsive means 44 has taken place and the thermoresponsive means is no longer symmetrically positioned about the axis of symmetry AS of holder element 31, but rather, a thicker portion 44A of thermoresponsive means 44 is positioned to one side of the AS.

After the solidification of the thermoresponsive means 44 the gyro is again tested to determine any unbalance of the gimbal element 20. It is possible that the gimbal element 20 would be balanced after this initial attempt, however, the normal occurrence is that there still is a small amount of unbalance on the gimbal element 20 generally in the range of 10 dyne centimeters or less. The position of the remaining unbalance is located and the magnitude thereof is determined by suitable test. The unbalance is defined as the location and the magnitude of the mass required to be applied to the gimbal element in order to statically balance the element. The gimbal is then oriented such that the unbalance is located on the top side of the gimbal element 20 relative to the OA. One method of balancing out this fine unbalance (10 dyne centimeters) is to maintain the OA of the gyro horizontal.

This results in the maximum sensitivity of the balance capsule since in this position the axis of symmetry of the balancing element 30 is generally perpendicular to the earth's gravity vector. Assume for the sake of illustration that the unbalance of the gimbal is located on the same side of the AS of the holder element 31 as the portion 44A of the thermoresponsive means 44 illustrated in FIGURE 4. In this case, the gimbal would be oriented so that the portion 44A would be rotated 180° about the AS from the position shown in FIGURE 4.

Then the heating coil element 33 is energized for a length of time proportional to the magnitude of the unbalance of the gimbal element 20. This results in a portion 44B of the thermoresponsive means 44 becoming plastic. Only a portion 44B of the thermoresponsive means 44 becomes plastic because of (1) the location of the heating coil 33, (2) the magnitude of energization to the heating coil means 33, and (3) the characteristic of the heat transfer through the holder element 31 to the thermoresponsive means 44. Because of the particular design of holder element 31, the center portion 44B of thermoresponsive means is reduced to the plastic state first. With continued energization of the heating coil means 31, the portion of the thermoresponsive means 44 becoming plastic increases gradually from the center outwardly. It is clear that varying the amount of time of energization of the heating coil means varies the amount of thermoresponsive means reduced to the plastic state. It should be pointed out that it is also possible to hold the amount of time of energization constant and to vary the magnitude of the energization applied to the heating coil means 33 to reduce the required amount of thermoresponsive means to the plastic state. The portion 44B of the thermoresponsive means 44 which has become plastic flows in response to the earth's gravitational force so as to shift the center of mass of the thermoresponsive means 44 relative to the AS of the element 31 and consequently relative to the OA of the gimbal 20. The energization is then removed from the heating coil means 33 and the portion 44B of the thermoresponsive means 44 is allowed to solidify, thus resulting in a final configuration of the thermoresponsive means as illustrated in FIGURE 5. After solidification of the thermoresponsive means 44B, the gyroscope is again tested to determine any unbalance therein. It is possible that there still may be a small amount of unbalance of the gimbal element 20, in which case the fine balance method could be repeated with a sufficient portion of the thermoresponsive means 44 being reduced to plastic state so as to cause the correct shift in the center of mass thereof.

Another method of balancing out the fine unbalance is to orient the OA of the gyro vertical so that the AS of the holder element 31 is parallel to the earth's gravity vector. Assume the unbalance of the gimbal is located on the same side of the AS of holder element 31 as the portion 44A of thermoresponsive means 44 illustrated in FIGURE 4. The heating coil means 33 is energized for a length of time proportional to the magnitude of the unbalance. This results in a portion of thermoresponsive means 44 becoming plastic for the reasons explained earlier. The portion of the thermoresponsive means 44 which becomes plastic assumes an orientation in response to the earth's gravitational force in which its free surface is parallel to the coplanar surface 42A. The energization is removed and the plastic portion of the thermoresponsive means solidifies. It is clear that this results in a slight shift in the center of mass of the thermoresponsive means 44. It is also possible to hold the length of time constant and vary the magnitude of the energization of heating coil means 33 to obtain the necessary mass shift. It is also possible to hold both the time of energization and the magnitude of energization constant and vary the orientation of the AS of holder element 31 relative to earth's gravity vector to obtain the necessary mass shift.

It should be pointed out that although the gyro spin motor is rotating at the time that the gyroscope is tested so as to determine the unbalance of the gimbal element 20, during the time that the heating coil means 33 are energized and the thermoresponsive means 44 is in the plastic state, the spin motor does not rotate.

An alternate embodiment 130 of the balancing means is illustrated in FIGURE 6. This alternate configuration of the holder element is identified by reference numeral 131. The surface 142 of holder element 131 comprises a generally circular coplanar portion 142A and an edge portion 142B around the periphery thereof. The edge portion 142B intersects the coplanar portion 142A at a right angle, thus defining a right cylindrical surface 142. The treated surface 143, to which thermoresponsive means 44 adheres, comprises the same material as treated surface 43, herein before discussed with reference to FIGURES 3–5. There is no such treatment on outer surface 147 of edge portion 142B.

Still another embodiment of the balancing means 230 is illustrated in FIGURE 7. The holder element is identified by the reference numeral 231. The surface 242 of holder element 231 comprises a coplanar surface 242A, without the edge portions of the previously discussed holder elements 31 and 131. The coplanar surface 242A is treated with a suitable material such as nickel plate with a gold flash superimposed thereon. There is no such treatment on the outer edge 247 of coplanar surface 242A. It should be pointed out that the thermoresponsive means 44 does not separate from the coplanar treated surface 243 either in the plastic state or in the solid state, even though the axis of symmetry of holder element 231 is approximately perpendicular to the earth's gravitation vector. As explained earlier, the thermoresponsive means 44 does not separate from surface 243 because of the combination of the affinity of the thermoresponsive means 44 for the treated surface 243 and the surface tension of the thermoresponsive means 44, plus the lack of affinity between the thermoresponsive means 44 and the non-treated surface 247.

The method of balancing the gimbal 20 with the balancing means 130 and 230 illustrated in FIGURES 6 and 7 is identical to the method of balancing the gimbal element with balancing means 30 which has been discussed herein before and no further discussion of the method of operation of balancing means 130 and 230 is required.

In the manufacture of a floated gyro, it is necessary to balance the gimbal element 20 about an axis perpendicular to the OA so as to have the center of mass coincide with the center of floatation and thus eliminate any torques acting upon the gimbal when it is positioned within the gyro housing. Normally this is referred to as end-to-end balancing and the gimbal is balanced about the SRA by removing material from either end of the gimbal. In some instances, it is necessary to rough balance the gimbal element 20 prior to performing the end-to-end balancing. This is because the displacement of the thermoresponsive means 44 during the rough balancing operation, as illustrated in FIGURE 4, also causes the center of mass to shift along the OA sufficient to "unbalance" the gimbal about the SRA an amount greater than can be tolerated in these instances. This "unbalance" is eliminated when the gimbal element 20 is rough balanced about the OA before it is balanced end-to-end about the SRA.

It is also possible to utilize the applicants' balancing means 30 to statically balance the gimbal element about the SRA (end-to-end balancing). In this case, the balancing means 30 is positioned upon the gimbal element 20 so that the axis of symmetry of the holder element 21 is parallel to the SRA. The balancing means 30 operates in the same manner as previously discussed and no further discussion is deemed necessary.

While we have shown and described a specific embodiment of this invention, further modifications and improvements will occur to those skilled in the art. We desire

What we claim is:

1. In a sensitive instrument: an element supported for rotation about an axis; means for adjusting the static balance of said element about said axis comprising a member having an axis of symmetry rigidly attached to said element so that said axis of symmetry is aligned with said axis, said member having a planar treated surface; thermoresponsive means, said thermoresponsive means adhering only to said treated surface of said member, said thermoresponsive means normally maintaining a fixed relationship with respect to said member; and means for temporarily rendering said thermoresponsive means plastic so as to permit a shift in the center of mass of said thermoresponsive means while said thermoresponsive means remains in engagement with said surface of said member.

2. In a sensitive instrument: an element supported for rotation about an axis; means for adjusting the static balance of said element about said axis comprising a member rigidly attached to said element, said member having a portion of its surface plated; thermoresponsive means, said thermoresponsive means adhering only to said plated surface of said member, said thermoresponsive means normally maintaining a fixed relationship with respect to said member; and means for temporarily rendering said thermoresponsive means plastic so as to permit a shift in the center of mass of said thermoresponsive means while said thermoresponsive means remains in engagement with said portion of said surface.

3. In a sensitive instrument: an element supported for rotation about an axis; means for adjusting the static balance of said element about said axis comprising a member rigidly attached to said element, said member having an area thereof treated; thermoresponsive means, said thermoresponsive means adhering only to said treated area of said member even when said thermoresponsive means is in a plastic state, said thermoresponsive means normally maintaining a fixed relationship with respect to said member; and means for temporarily rendering said thermoresponsive means plastic so as to permit a shift in the center of mass of said thermoresponsive means while said thermoresponsive means remains in engagement with said area.

4. In a sensitive instrument: an element supported for rotation about an axis; means for adjusting the static balance of said element about said axis comprising a member rigidly attached to said element, said member having an area thereof; thermoresponsive means abutting and adhering to said area, said thermoresponsive means and said element being characterized so that in the zone of said area said thermoresponsive means adheres to said area even when said thermoresponsive means is in a plastic state, said thermoresponsive means normally maintaining a fixed relationship with respect to said member; and means for temporarily rendering said thermoresponsive means plastic so as to permit a shift in the center of mass of said thermoresponsive means.

5. In a sensitive instrument: an element supported for rotation about an axis; means for adjusting the static balance of said element about said axis comprising a member rigidly attached to said element; thermoresponsive means, said thermoresponsive means adhering to said member, said thermoresponsive means normally maintaining a fixed relationship with respect to said member; and means for temporarily rendering said thermoresponsive means plastic so as to permit a shift in the center of mass of said thermoresponsive means while the portion of said thermoresponsive means originally in engagement with said member remains in engagement therewith and remains fixed in position.

6. In a sensitive instrument: an element supported for rotation about an axis; means for adjusting the static balance of said element about said axis comprising a member rigidly attached to said element; thermoresponsive means, said thermoresponsive means adhering to said member, and defining an interface therebetween, said thermoresponsive means normally maintaining a fixed relationship with respect to said member; and means for temporarily rendering said thermoresponsive means plastic so as to permit a shift in the center of mass of said thermoresponsive means while the area of said interface remains constant and the position of said interface remains fixed.

7. In a sensitive instrument: an element supported for rotation about an axis; means for adjusting the static balance of said element about said axis comprising a member rigidly attached to said element; thermoresponsive means, said thermoresponsive means adhering to a surface of said member, said thermoresponsive means normally maintaining a fixed relationship with respect to said member; and means for temporarily rendering said thermoresponsive means plastic so as to permit a shift in the center of mass of said thermoresponsive means while said thermoresponsive means retains its original engagement with said surface.

8. In a sensitive instrument having an element supported for rotation about an axis: means for adjusting the static balance of said element about said axis comprising a member mounted on said element, thermoresponsive means adhered to said member, and means for rendering said thermoresponsive means plastic so as to permit the displacement of the center of mass of said thermoresponsive means relative to said member; the method of balancing the element comprising the steps of determining the location and magnitude of unbalance of said element, orienting said axis relative to the earth's gravity vector in a position determined by the location and magnitude of said unbalance, applying heat to said thermoresponsive means so as to render said thermoresponsive means plastic to permit the center of mass thereof to shift relative to said member in responsive to the earth's gravitational force, removing heat from said thermoresponsive means and allowing solidification thereof, determining the location and magnitude of unbalance of said element, orienting said element relative to earth's gravity vector in a position determined by the location of said unbalance, applying heat to said thermoresponsive means so as to render a portion of said thermoresponsive means plastic to permit the center of mass thereof to shift relative to said member in response to the earth's gravitational force, the length of time said heat is applied being proportional to the magnitude of said unbalance of said element, and removing heat from said thermoresponsive means and allowing solidification thereof.

9. In a sensitive instrument having an element supported for rotation about an axis: means for adjusting the static balance of said element about said axis comprising a member mounted on said element, thermoresponsive means adhered to said member, and heating means for rendering said thermoresponsive means plastic so as to permit the displacement of the center of mass of said thermoresponsive means relative to said member; the method of balancing said element comprising the steps of determining the location and magnitude of unbalance of said element, orienting said axis relative to the earth's gravity vector in a position determined by the location and magnitude of said unbalance, energizing heating means so as to render said thermoresponsive means plastic to permit the center of mass thereof to shift relative to said member in response to the earth's gravitational force, removing energization to said heating means and allowing solidification thereof, determining the location and magnitude of unbalance of said element, orienting said element relative to earth's gravity vector in a position determined by the location of said unbalance, energizing said heating means so as to render a portion of said thermoresponsive means plastic to permit the center of mass thereof to shift relative to said member in response to the earth's gravitational force, the energization applied being proportional to the magnitude of said unbalance of said element and removing energization to said heating means and allowing solidification thereof.

10. In a sensitive instrument having an element supported for rotation about an axis: means for adjusting the static balance of said element about said axis comprising a member mounted on said element, thermoresponsive means adhered to said member, and means for rendering said thermoresponsive means plastic so as to permit the displacement of the mass center of said thermoresponsive means relative to said member; a method of balancing said element comprising the steps of determining the location and magnitude of unbalance of said element, orienting said axis relative to the earth's gravity vector in a position determined by the location and magnitude of said unbalance, applying heat to said thermoresponsive means so as to render said thermoresponsive means plastic to permit the center of mass thereof to shift relative to said member in response to the earth's gravitational force, removing heat from said thermoresponsive means and allowing solidification thereof, determining the location and magnitude of unbalance of said element, orienting said element relative to earth's gravity vector in a position determined by the location of said unbalance, applying heat to said thermoresponsive means so as to render a portion of said thermoresponsive means plastic to permit the center of mass thereof to shift relative to said member in responsive to the earth's gravitational force, the orientation of said element relative to the earth's gravity vector being proportional to the magnitude of said unbalance of said element, and removing heat from said thermoresponsive means and allowing solidification thereof.

References Cited in the file of this patent

UNITED STATES PATENTS

| 829,251 | Booraem | Aug. 21, 1906 |
| 2,859,626 | Maze | Nov. 11, 1958 |

FOREIGN PATENTS

| 1,224,158 | France | Feb. 8, 1960 |